US009003002B2

(12) United States Patent
Patel et al.

(10) Patent No.: US 9,003,002 B2
(45) Date of Patent: Apr. 7, 2015

(54) EFFICIENT PORT MANAGEMENT FOR A DISTRIBUTED NETWORK ADDRESS TRANSLATION

(75) Inventors: Parveen K Patel, Redmond, WA (US); Ashwin Murthy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 13/353,279

(22) Filed: Jan. 18, 2012

(65) Prior Publication Data
US 2013/0185404 A1 Jul. 18, 2013

(51) Int. Cl.
G06F 15/177 (2006.01)
G06F 15/173 (2006.01)
H04L 29/12 (2006.01)

(52) U.S. Cl.
CPC ........ *H04L 61/2514* (2013.01); *H04L 61/2517* (2013.01); *H04L 61/2557* (2013.01)

(58) Field of Classification Search
CPC ................ H04L 29/1233; H04L 29/06; H04L 29/12537; H04L 61/20; H04L 61/2553; G06F 15/177; G06F 12/02
See application file for complete search history.

(56) References Cited

U.S. PATENT DOCUMENTS

| 6,577,600 | B1 | 6/2003 | Bare | |
| 6,954,784 | B2 * | 10/2005 | Aiken et al. | 709/220 |
| 7,072,981 | B1 | 7/2006 | O'Rourke et al. | |
| 7,487,242 | B2 | 2/2009 | Banerjee et al. | |
| 7,869,439 | B1 * | 1/2011 | Ramberg et al. | 370/395.54 |
| 7,912,046 | B2 * | 3/2011 | Li et al. | 370/389 |
| 8,289,968 | B1 * | 10/2012 | Zhuang | 370/392 |
| 2004/0205693 | A1 * | 10/2004 | Alexander et al. | 717/100 |
| 2010/0175123 | A1 * | 7/2010 | Karino et al. | 726/12 |
| 2011/0047256 | A1 * | 2/2011 | Babu et al. | 709/223 |
| 2011/0271112 | A1 * | 11/2011 | Bajko et al. | 713/168 |
| 2013/0067110 | A1 * | 3/2013 | Sarawat et al. | 709/238 |

OTHER PUBLICATIONS

Ford, et al., "Issues with IP Address Sharing", Published on: Jun. 2011, Available at: http://tools.ietf.org/html/rfc6269.
Srisuresh, et al., "Load Sharing using IP Network Address Translation (LSNAT)", Published on: Oct. 1998, Available at: http://tools.ietf.org/html/rfc2391.

(Continued)

*Primary Examiner* — Joshua Joo
*Assistant Examiner* — Younes Naji
(74) *Attorney, Agent, or Firm* — Ben Tabor; Stein Dolan; Micky Minhas

(57) ABSTRACT

A central NAT manager efficiently allocates ports to endpoints of a tenant application in a hosting environment for NAT purposes. In some instances, the central NAT manager may pre-allocate ports to endpoints as part of the initial configuration of the tenant application. The pre-allocation process may include persisting pre-allocated port state information in storage and configuring endpoints and a NAT device with the pre-allocated port state information. Additional ports may be dynamically allocated to endpoints during runtime using dynamically determined port allocation sizes. In other instances, the central NAT manager may reserve ports for endpoints during the initial configuration of the tenant application by assigning ports to endpoints and persisting port assignment information to storage. During runtime, endpoints may issue port allocation requests to the central NAT manager, which may allocate ports to the endpoints from the range of ports initially reserved for each endpoint.

18 Claims, 9 Drawing Sheets

(56) References Cited

OTHER PUBLICATIONS

Kontogiannis, et al., "A Probing Algorithm with Adaptive Workload Load Balancing Capabilities for Heterogeneous Clusters", In Journal of Computing, vol. 3, Issue 7, pp. 107-116. Published: Jul. 2011.

"Server Load Balancing in Today's Web-enabled Enterprises" In White Paper of Foundry Networks, Apr. 2002, pp. 10.

"Barracuda Link Balancer Administrator's Guide", Retrieved on: Nov. 2, 2011, Available at: http://www.barracudanetworks.com/ns/downloads/Admin_Guides/AG_Barracuda_Link_Balancer_Admin_Guide.pdf.

* cited by examiner

EFFICIENT PORT MANAGEMENT FOR A DISTRIBUTED NETWORK ADDRESS TRANSLATION

BACKGROUND

Large-scale networked systems are commonplace platforms employed in a variety of settings for running applications and maintaining data for business and operational functions. For instance, a hosting environment such as a data center (e.g., a physical cloud computing infrastructure) may provide a variety of services (e.g., web applications, email services, search engine services, etc.) for a plurality of customers simultaneously. These large-scale networked systems typically include a large number of resources distributed throughout the data center, in which each resource resembles a physical machine or a virtual machine running on a physical host. When the data center hosts multiple tenants (e.g., customer applications), these resources are optimally allocated from the same data center to the different tenants.

When a customer's application is implemented in a hosting environment, the application may be provided by endpoints running on the resources in the hosting environment. As used herein, an endpoint may be a network interface with an address. Because the hosting environment may comprise a private network or the hosted endpoints may otherwise not have public addresses, network address translation (NAT) functionality may be provided to facilitate outgoing connections from the endpoints to entities the private network. A network address translation may be implemented as a distributed system in which multiple NAT devices participate in network address translation while behaving as one single device to the user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to efficiently allocating ports to in a distributed network address translation (NAT) system. In some instances, a central NAT manager may pre-allocate ports to endpoints as part of the initial configuration of the tenant application. The pre-allocation process may include persisting pre-allocated port state information in storage and configuring endpoints and a NAT device with the pre-allocated port state information as part of the initial configuration of the tenant application. Additional ports may be dynamically allocated to endpoints during runtime using dynamically determined port allocation sizes, which may be based on predicted port demand. In other instances, the central NAT manager may reserve ports for endpoints during the initial configuration of the tenant application by assigning ports to endpoints and persisting port assignment information to storage. During runtime, endpoints may issue port allocation requests to the central NAT manager, which may allocate ports to the endpoints from the range of ports initially reserved for each of the endpoints.

BRIEF DESCRIPTION OF THE DRAWINGS

The present invention is described in detail below with reference to the attached drawing figures, wherein.

DETAILED DESCRIPTION

Figure 1:
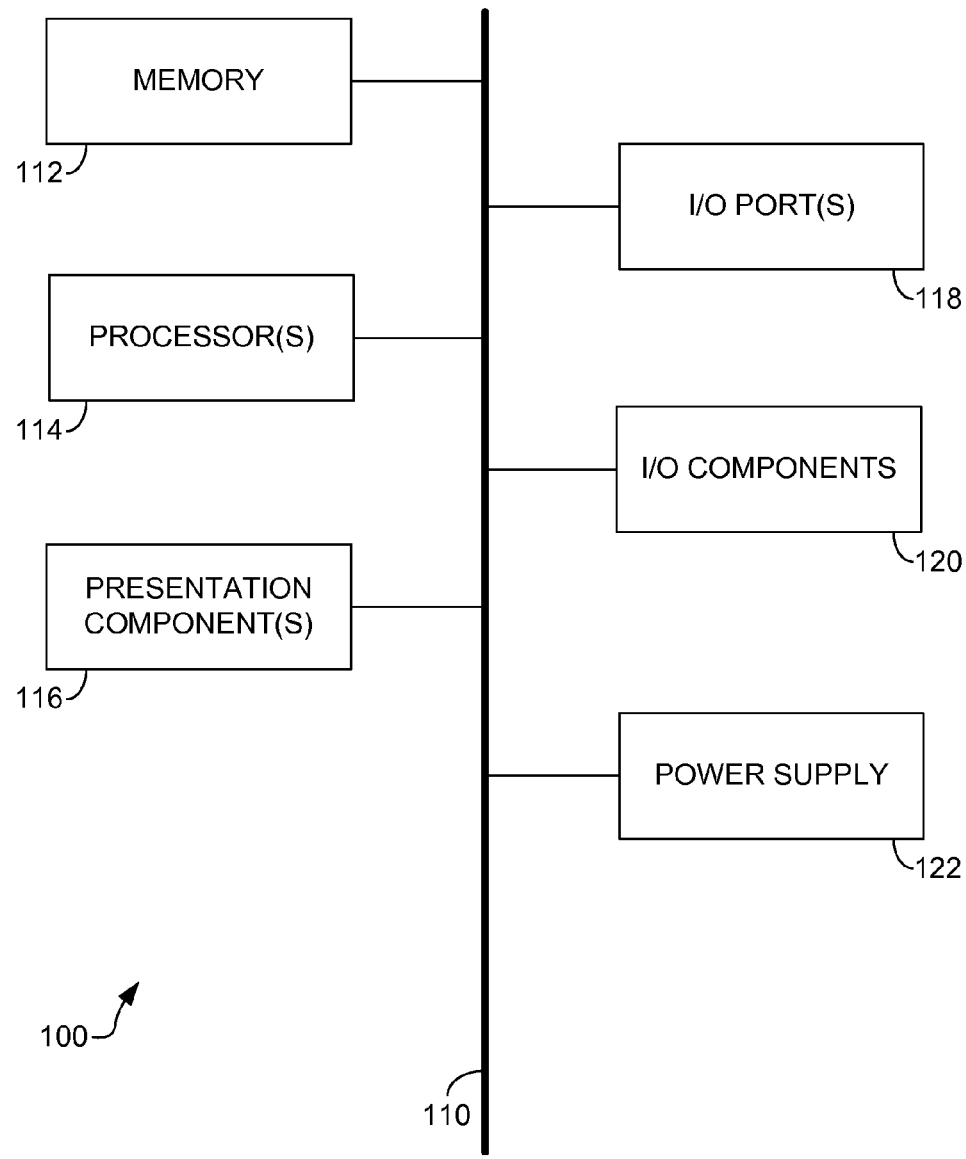
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to approaches for a central NAT manager in a hosting environment to efficiently allocate ports to endpoints of a tenant application to facilitate NAT functionality for the endpoints to establish outbound connections to components external to the private network of the hosting environment. In some instances, the central NAT manager may "pre-allocate" ports to endpoints. The ports are pre-allocated in the sense that the ports are allocated to endpoints during initial configuration of the tenant application, as opposed to waiting to allocate the ports until connection attempts are made by endpoints. The port pre-allocation process may include assigning a range of ports to each endpoint that is expected to make outbound connections and need NAT functionality. State information regarding the range of ports assigned to each endpoint is durably persisted in storage. Additionally, NAT devices are configured with the ports assigned so that network translation can take place in both inbound and outbound directions. In one embodiment, the host devices that host the endpoints are configured with the ports assigned to each endpoint. Further, a NAT device that routes return packets to appropriate endpoints is configured with information mapping ports to the direct IP (DIP) address of the endpoints.

It should be understood that the device referred to as "NAT device" herein may act like a router (since it may simply forward packets based on VIP, port mappings). Additionally, the host device may perform network address functions (and act in some sense as a network address translation device) by rewriting addresses and ports in outgoing and incoming packets.

After ports have been pre-allocated to endpoints, additional ports may be dynamically allocated to endpoints during runtime. The dynamic allocation may include dynamically determining a number of ports to assign to endpoints based on, for instance, a predicted demand for ports by the various endpoints. This may include increasing the number of ports assigned to an endpoint with each subsequent request for additional ports from the endpoints. In some instances, when a port is dynamically allocated (as opposed to being pre-allocated), the host may release the port back to the central NAT manager when the outbound connection using that port completes. This is in contrast to pre-allocated ports, which may not be automatically released by a host.

In other instances, the central NAT manager may "reserve" ports for endpoints. The ports are reserved for endpoints in the sense that during initial configuration of the tenant application (i.e., before runtime), ports are assigned to endpoints and the port assignments are durably persisted in storage. However, the endpoints and/or NAT devices are not configured with the ports at that time. Instead, during runtime, when an endpoint needs to make an outbound connection, the endpoint makes a request for port allocation to the central NAT manager, which allocates ports to the endpoint from the range of ports initially reserved for that endpoint. The endpoint and NAT may be configured at that time with the ports allocated to the endpoint. Since the ports do not need to be persisted during every dynamic allocation, this saves the time to write port allocation to storage and hence reduces the time needed to allocate ports.

Accordingly, in one aspect, an embodiment of the invention is directed to one or more computer storage media storing computer-useable instructions that, when used by one or more computing devices, cause the one or more computing devices to perform a method. The method includes receiving initial configuration information for a tenant application to be hosted by a hosting environment, the tenant application being associated with a virtual IP (VIP) address, the initial configuration information specifying endpoints for the tenant application, each endpoint having a direct IP (DIP) address corresponding with the VIP address. The method also includes, as part of a configuration process for the tenant application, pre-allocating ports to the endpoints; persisting state information in storage, the state information mapping the VIP address to the DIP addresses for the endpoints and mapping the DIP addresses for the endpoints to the ports pre-allocated to the endpoints; configuring host devices hosting the endpoints with information regarding the ports pre-allocated to the endpoints; and configuring a network address translation (NAT) device with information regarding the ports pre-allocated to the endpoints.

In another embodiment of the invention, an aspect is directed to a method for allocating ports to endpoints of a tenant application being hosted by a hosting environment, the tenant application being assigned a virtual IP (VIP) address and the endpoints being assigned a direct IP (DIP) address corresponding with the VIP address. The method includes initially pre-allocating ports to the endpoints of the tenant application during initial configuration of the tenant application. The method also includes receiving a first request for additional ports from a first endpoint of the tenant application. The method further includes assigning a first set of additional ports to the first endpoint in response to the first request, persisting state information for the first set of additional ports in storage, and configuring a host device hosting the first endpoint and a network address translation device (NAT) device with information regarding the first set of additional ports assigned to the first endpoint. The method also includes receiving a second request for additional ports from the first endpoint. The method further includes determining if the second request is within a threshold period of time following the first request. If the second request is not within the threshold period of time following the first request, the method includes assigning a second set of additional ports that has the same number or lower number of ports as the first set of additional ports. If the second request is within the threshold period of time following the first request, the method includes assigning a second set of additional ports that has a greater number of ports than the first set of additional ports. The method further includes persisting state information for the second set of additional ports in storage. The method still further includes configuring a host device hosting the first endpoint and the NAT device with information regarding the second set of additional ports assigned to the first endpoint.

A further aspect of the invention is directed to a system for allocating ports for network address translation (NAT) purposes to endpoints of a tenant application being hosted by a hosting environment. The system includes a plurality of host devices hosting the endpoints of the tenant application, each host device comprising a host plug-in facilitating configuration of ports for endpoints for NAT purposes. The system also includes a NAT device providing NAT functionality. The system further includes a central NAT manager having a processor and being configured to reserve ranges of ports for the endpoints of the tenant application during initial configuration of the tenant application by assigning the ranges of ports to the endpoints and persisting information regarding the ranges of ports assigned to the endpoints in a state repository, the central NAT manager also being configured to receive requests for port allocations for endpoints from host plug-ins on the plurality of host devices during runtime, to allocate ports to the endpoints based on the range of ports assigned to the endpoints, and to configure the host plug-ins and NAT device with the allocated ports. The state repository is configured for durably storing state information regarding port assignments to endpoints.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Some embodiments of the present invention may be implemented within a hosting environment, such as a data center that operates as a platform as a service (PAAS) using a tenant/service model in which customers' applications run in a cloud service infrastructure that provides a platform for developing and running the customers' applications. The data center may include a large number of physical machines, on which virtual machines may be allocated and customer applications run.

Figure 2:
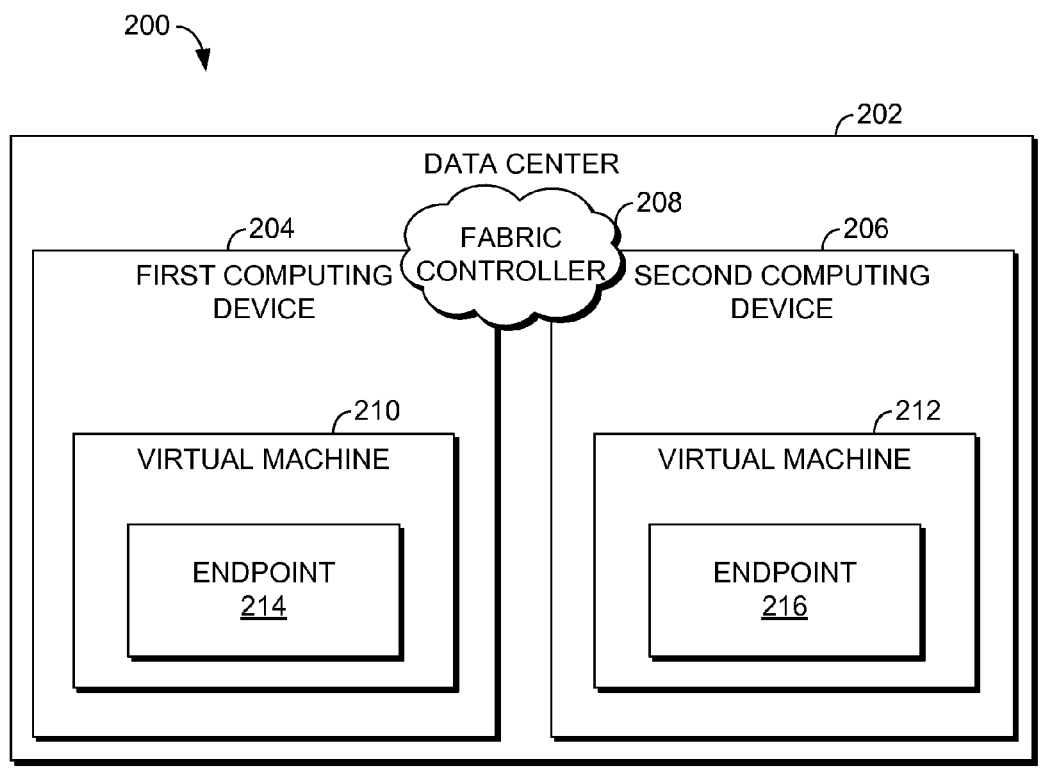
FIG. 2 is a block diagram illustrating an exemplary cloud computing platform suitable for use in implementing embodiments of the present invention.

Referring to FIG. 2, a block diagram is provided that illustrates an exemplary cloud computing platform 200. It will be understood and appreciated that the cloud computing platform 200 shown in FIG. 2 is merely an example of one suitable computing system environment and is not intended to suggest any limitation as to the scope of use or functionality of embodiments of the present invention. For instance, the cloud computing platform 200 may be a public cloud, a private cloud, or a dedicated cloud or simply a collection of disparate computing devices. Neither should the cloud computing platform 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of physical machines, virtual machines, data centers, role instances, or combinations thereof may be employed to achieve the desired functionality within the scope of embodiments of the present invention.

The cloud computing platform 200 includes the data center 202 configured to host and support operation of endpoints 214 and 216 of a particular service application. The phrase "service application," as used herein, broadly refers to any software, or portions of software, that runs on top of, or accesses storage locations within, the data center 202. In one embodiment, one or more of the endpoints 214 and 216 may represent the portions of software, component programs, or instances of roles that participate in the service application. In another embodiment, one or more of the endpoints 214 and 216 may represent stored data that is accessible to the service application. It will be understood and appreciated that the endpoints 214 and 216 shown in FIG. 2 are merely an example of suitable parts to support the service application and are not intended to suggest any limitation as to the scope of use or functionality of embodiments of the present invention.

Generally, virtual machines 210 and 212 are allocated to the endpoints 214 and 216 of the service application based on demands (e.g., amount of processing load) placed on the service application and/or a service definition specified by the customer in the customer's service model. As used herein, the phrase "virtual machine" is not meant to be limiting, and may refer to any software, application, operating system, or program that is executed by a processing unit to underlie the functionality of the endpoints 214 and 216. Further, the virtual machines 210 and 212 may include processing capacity, storage locations, and other assets within the data center 202 to properly support the endpoints 214 and 216.

In operation, the virtual machines 210 and 212 are dynamically allocated within physical resources (e.g., first computing device 204 and second computing device 206) of the data center 202, and endpoints (e.g., the endpoints 214 and 216) are dynamically placed on the allocated virtual machines 210 and 212 to satisfy the current processing load. In one instance, a fabric controller 208 is responsible for automatically allocating the virtual machines 210 and 212 and for placing the endpoints 214 and 216 within the data center 202. By way of example, the fabric controller 208 may rely on a service definition (e.g., designed by a customer that owns the service application) to provide guidance on how and when to allocate the virtual machines 210 and 212 and to place the endpoints 214 and 216 thereon.

As discussed above, the virtual machines 210 and 212 may be dynamically allocated within the first computing device 204 and second computing device 206. In accordance with embodiments of the present invention, the computing devices 204 and 206 may represent any form of computing devices, such as the computing device 100 of FIG. 1. The computing devices 204 and 206 may host and support the operations of the virtual machines 210 and 212, while simultaneously hosting other virtual machines carved out for supporting other tenants of the data center 202, including supporting the role instances of other service applications owned by different customers.

In one aspect, the endpoints 214 and 216 operate within the context of the cloud computing platform 200 and, accordingly, may communicate internally through connections dynamically made between the virtual machines 210 and 212, and externally through a physical network topology to resources of a remote network. The internal connections may involve interconnecting the virtual machines 210 and 212, distributed across physical resources of the data center 202, via a network cloud (not shown). The network cloud interconnects these resources such that the role instances may recognize a location of other role instances, in order to establish a communication therebetween. In addition, the network cloud may establish this communication over channels connecting the endpoints 214 and 216 of the service application.

Figure 3:
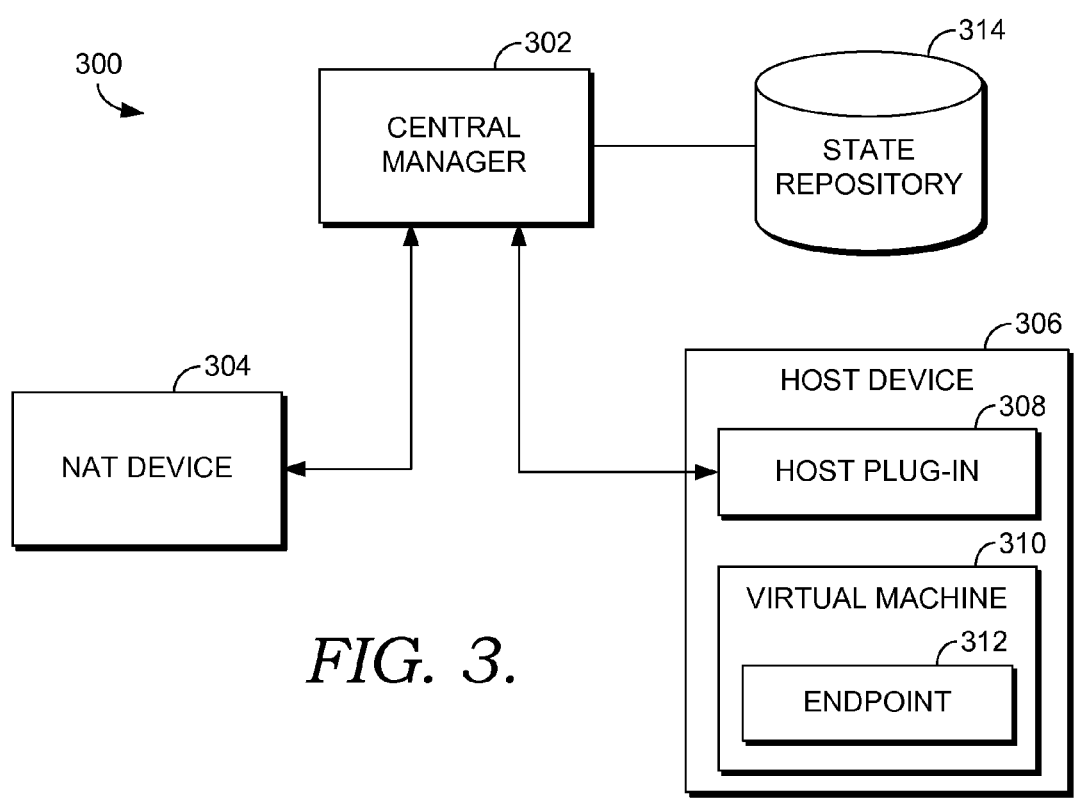
FIG. 3 is a bock diagram illustrating a computing environment for allocating ports for use by endpoints for NAT purposes for use in implementing embodiments of the present invention.

Turning now to FIG. 3, a block diagram is provided that illustrates a hosting environment 300 hosting a tenant application. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

A tenant application may be deployed within the hosting environment 300 in accordance with a service definition. When the tenant application is initially configured in the hosting environment, a virtual IP (VIP) address may be assigned to the tenant application. The VIP address may be a publicly addressable IP address that devices on a public network, such as the Internet, may access. It should be understood that an application may use a pool of VIP addresses. Further, a pool of VIP addresses may be shared by multiple applications.

Additionally, a number of endpoints, such as the endpoint 312, may be configured to run on virtual machines, such as the virtual machine 310, hosted by host devices, such as the host device 306, in the hosting environment 300. Although only a single host device 306 is shown in FIG. 3, it should be understood that any number of host devices may be provided in the hosting environment to host portions of the tenant application. Additionally, although only a single virtual machine 310 and endpoint 312 are shown on the host device 306, any number of virtual machines and endpoints may be provided on the host device 306.

Each endpoint may have a dedicated IP (DIP) address that is not publicly addressable but instead is operable on a private network of the hosting environment 300 to directly address packets on the private network to the endpoint corresponding with the DIP address. The DIP addresses are associated with the VIP address for routing packets, for instance, between the public network and the private network using NAT functionality.

As part of the initial tenant configuration, the endpoints that are to be provided with NAT functionality may be specified. This may include all endpoints of the tenant application or only a portion of the endpoints. If only a portion of the endpoints are to be provided with NAT functionality, the tenant definition that defines how the tenant application is to be configured in the hosting environment may identify those endpoints.

To provide NAT functionality to facilitate outbound connections for endpoints in the hosting environment 300, a central NAT manager 302 may coordinate allocating ports to endpoints. For instance, the central NAT manager 302 may allocate ports to the endpoint 312 for NAT purposes. When the central NAT manager 302 allocates ports to the endpoint 312, the central NAT manager 302 may persist the state of those ports as being allocated to the endpoint 312 in the state repository 314. Additionally, the central NAT manager 302 may communicate with a host plug-in 308 on the host device 308 to configure the endpoint 312 to use the allocated ports. The central NAT manager 302 further communicates with a NAT device 304 to configure the NAT device 304 with the ports allocated to the endpoint 312, for instance, providing mapping information mapping the port to the DIP address of the endpoint 312.

When the endpoint 312 makes an outbound connection with a component outside of the private network, the endpoint 312 uses a VIP and a port that was allocated to the endpoint 312. When return packets are received at the hosting environment from an external device, the NAT device 304 uses the port information configured on the NAT device 304 by the central NAT manager 302 to route the return packets to the endpoint 312. In particular, because the outgoing message from the endpoint 312 included the VIP for the tenant and a port that was assigned to that endpoint 312 as the origination address, the return packets will use the VIP and port as the destination address. The NAT device 304 may check its mapping information to identify the DIP of the endpoint 312 corresponding with that port and route the packets to that DIP.

One approach to assigning ports to endpoints is dynamic allocation, in which endpoints request ports from the central NAT manager 302 whenever an outbound connection is needed. As discussed in further detail below, embodiments of the present invention provide different approaches to more efficiently manage port allocations for endpoints.

Pre-Allocation of Ports

In accordance with some aspects of the present invention, as a part of the initial programming of a tenant application and deploying the tenant application in a hosting environment, a central NAT manager, such as the central NAT manager 302, optimistically pre-allocates one or more ports to each endpoint, such as endpoint 312, to be provided with NAT functionality for use in outgoing connections by each endpoint. In embodiments, multiple ports may be pre-allocated to each endpoint (i.e., each DIP address). For instance, a slot of a fixed number of ports (e.g., eight ports) may be pre-allocated to an endpoint. In some instances, an equal number of ports may be pre-allocated to each endpoint. In other instances, a different number of ports may be pre-allocated to different endpoints, for instance, based on expected port demand for the various endpoints. Additionally, in some approaches, a fixed sized pre-allocation may be made irrespective of the tenant size (i.e., the number of endpoints (DIP addresses) associated with a tenant's VIP address). In another approach, the number of endpoints associated with a tenant may be used as a factor in determining the number of pre-allocated ports. For instance, the pre-allocation size may be inversely proportional to the number of endpoints. In such instances, a tenant with a small number of DIP addresses may be provided larger pre-allocation sizes.

The pre-allocation of ports is optimistic in the sense that the ports are allocated to endpoints not in response to a request for a port during runtime but as part of the initial programming and deployment of the tenant application in the hosting environment. In some instances, the pre-allocated ports are not released as long as the tenant application is running even if the ports are unused. There may be some circumstances in which the central NAT manager may reclaim pre-allocated ports, but the host may not simply release ports if the ports are unused but instead may only release ports in response to instructions from the central NAT manager to release the ports.

By having a central NAT manager pre-allocate ports to endpoints, the endpoints don't need to request ports from the central NAT manager when the endpoints make outbound connections. Instead, the pre-allocated ports are used by the endpoints for the outbound connections. Accordingly, pre-allocation of ports provides an efficient approach to port allocation that reduces load on the central NAT manager. Additionally, because endpoints can use pre-allocated ports for outbound connections, the endpoints don't need to wait for the central NAT manager to allocate ports when outbound connections are made. This reduces latency in establishment of the outbound connections.

Figure 4:
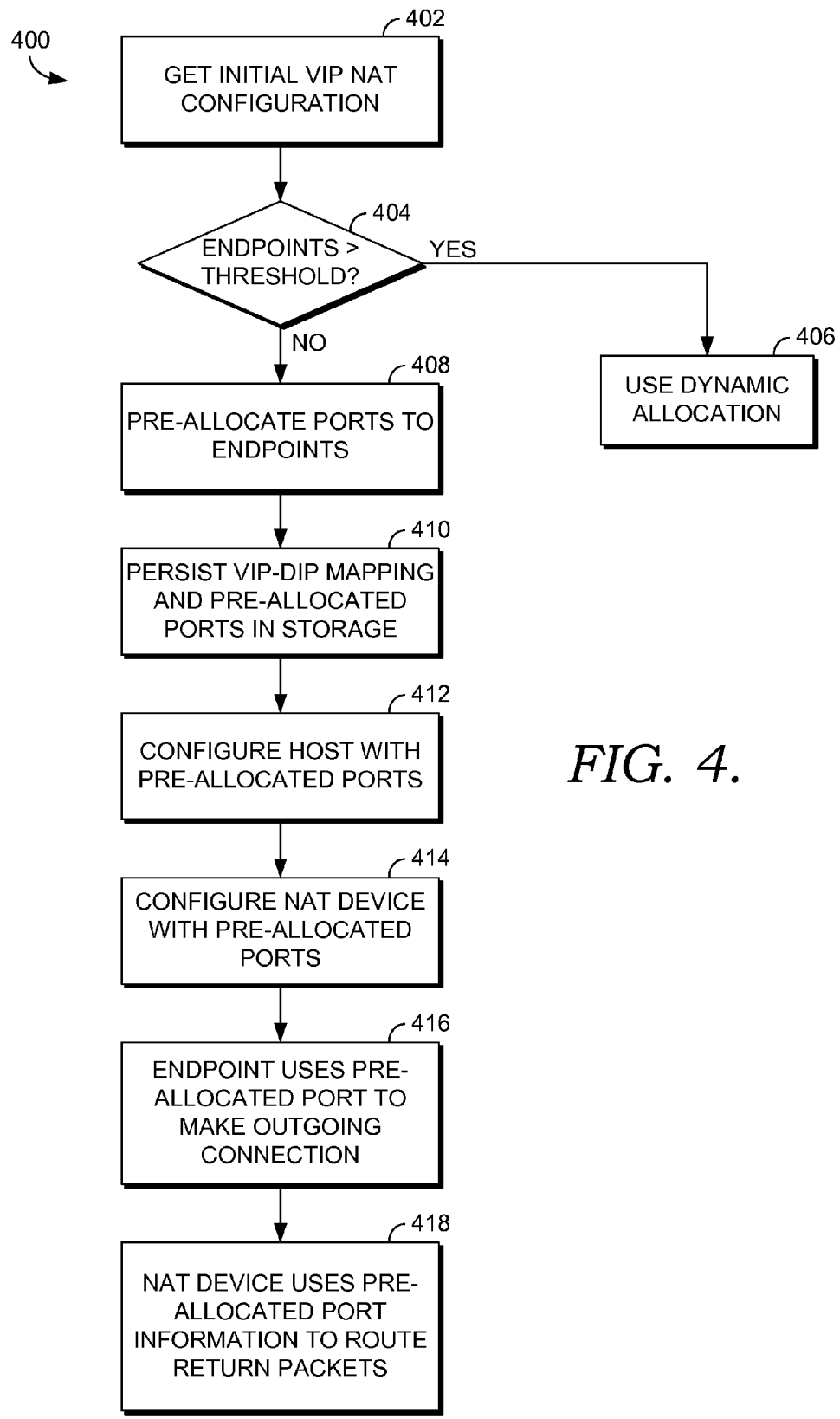
FIG. 4 is a flow diagram showing a method for pre-allocating ports in accordance with an embodiment of the present invention.

Turning now to FIG. 4, a flow diagram is provided that illustrates a method 400 for pre-allocating ports. As shown at block 402, a central NAT manager, such as the central NAT manager 302 of FIG. 3, receives an initial VIP NAT configuration for a tenant. The VIP NAT configuration may include information such as identification of the VIP, identification of the endpoints (each identified by a corresponding DIP) associated with the VIP, and the particular endpoints that are to likely make outbound connections and are to be pre-allocated ports for NAT purposes.

As shown at block 404, a determination is made regarding whether the number of endpoints associated with the VIP exceeds a particular threshold. In particular, a limited range of ports may be available for allocation to endpoints for the VIP. As such, if there are large number of endpoints, the number of available ports may not be sufficient and it may be preferable not to pre-allocate ports to those endpoints and instead to use a dynamic allocation approach. If it is determined that the number of endpoints exceeds the threshold, a dynamic allocation approach is employed for allocating ports to the endpoints for the VIP without performing any pre-allocation, as shown at block 406. In particular, instead of pre-allocating ports to the endpoints, the central NAT manager waits for requests for ports from endpoints during runtime and dynamically allocates ports to the endpoints in response to the requests.

Alternatively, if the number of endpoints does not exceed the threshold, the central NAT manager pre-allocates ports to the endpoints for the VIP that were identified as being ones to be configured to make outbound connections, as shown at block 408. The ports are pre-allocated from the range of ports available for the VIP. In some instances, the central NAT manager may pre-allocate a same number of ports to each of the endpoints. In other instances, the central NAT manager may pre-allocate a different number of ports to different endpoints based on various factors such as expected port demand for each endpoint. The ports may be allocated in slots that comprise a certain number of ports. For instance, a slot may include eight ports.

Based on the pre-allocation of ports to endpoints, the central NAT manager durably persists information regarding the VIP-DIPs mapping and pre-allocated ports in storage, such as in the state repository 314 of FIG. 3, as shown at block 410. The persisted information may include a mapping that associates the ports to the DIPs to which the ports were pre-allocated and associates the DIPs with the VIP.

The central NAT manager also communicates with host plug-ins on host devices (e.g., host plug-in 308 on host device 306 of FIG. 3) and a NAT device (e.g., the NAT device 304 of FIG. 3) to configure those components based on the pre-allocation of ports. In particular, the hosts and the NAT device are on the data path when outgoing connections are made and return packets are received. As such, the central NAT manager configures a host with pre-allocated ports, as shown at block 412. This may be done, for instance, by providing pre-allocation port information for endpoints residing on a host device to a host plug-in on that host device. This may be done for all host devices hosting endpoints associated with a particular VIP being configured. In addition to configuring hosts, the central NAT manager configures the NAT device with pre-allocated ports by providing information regarding the ports that have been pre-allocated to respective endpoints (e.g., by providing DIP-port mappings), as shown at block 414.

It should be understood that ports may be identified as pre-allocated in a variety of different manners. This may include using a bit that is set in a port's state to indicate the status of the port as being pre-allocated or not. For instance, a Boolean flag IsPre-allocated may be employed. For pre-allocated port ranges, this flag is set to true. For all free ports or ports that have been dynamically allocated, this flag is set to false. This flag may be stored durably by the central NAT manager.

After configuration and during runtime, when an endpoint with pre-allocated ports needs to make an outgoing connection, the endpoint uses a port that has been pre-allocated to the endpoint, as shown at block 416. The endpoint does not need to make a request to the central NAT manager for a port because it uses one of the ports that have already been pre-allocated to that endpoint. When return packets are received at the hosting environment from an external device, the NAT device uses the pre-allocated port information configured on the device by the central NAT manager to route the return packets to an appropriate endpoint, as shown at block 418. In particular, because the outgoing message from an endpoint included the VIP for the tenant and a port that was pre-allocated to that endpoint as the origination address, the return packets will use the VIP and port as the destination address. The NAT device will check its mapping information to identify the DIP of the endpoint corresponding with that port and route the packets to that DIP.

Figure 5:
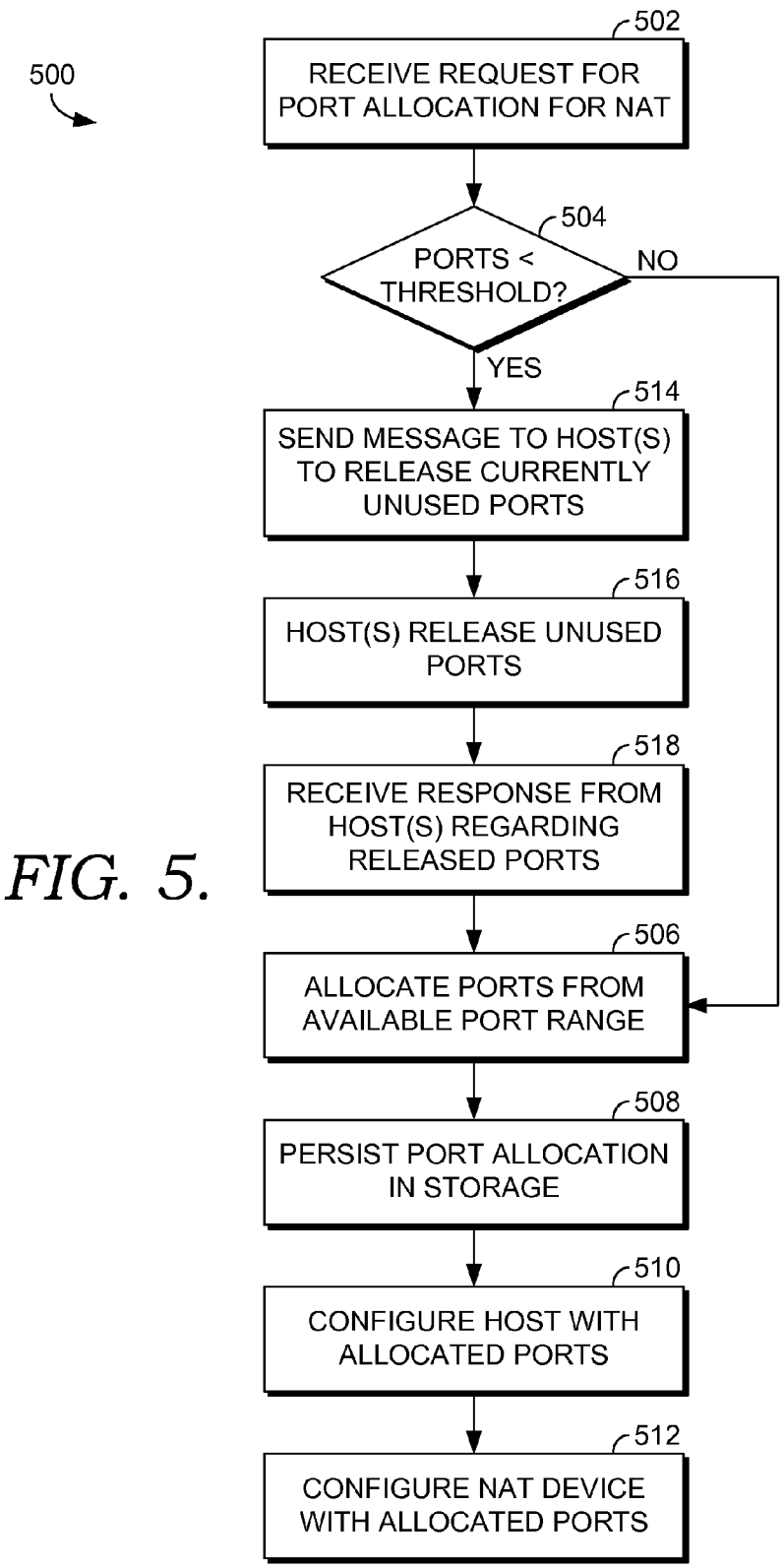
FIG. 5 is a flow diagram showing a method for reclaiming pre-allocated ports based on the number of free ports being below a threshold in accordance with an embodiment of the present invention.

As noted above, once a port has been pre-allocated to an endpoint, the endpoint will typically not release that pre-allocated port as long as that endpoint is in existence even if the port is being unused. However, the central NAT manager may reclaim pre-allocated ports if needed. For instance, if the central NAT manager needs additional ports for dynamic allocation purposes (as will be described in further detail below), the central NAT manager may reclaim pre-allocated ports that are being unused by endpoints. With reference now to FIG. 5, a flow diagram is provided that illustrates a method 500 for reclaiming pre-allocated ports. As shown at block 502, central NAT manager receives a request from an endpoint for port allocation to that endpoint for NAT purposes.

As shown at block 504, the central NAT manager determines whether the number of available ports to be allocated to endpoints is below a certain threshold. If it is determined that the number of available ports is not below the threshold, the central NAT manager may dynamically allocate ports to the requesting endpoint from the available port range, as shown at block 506. The port allocation to the endpoint is persisted in storage, as shown at block 508. Additionally, the host device hosting the endpoint is configured with the allocated ports, as shown at block 510, and the NAT device is configured with information regarding the allocated ports for the endpoint, as shown at block 512.

Alternatively, if at block 504, it is determined that the number of available ports to be dynamically allocated is a below the threshold, the central NAT manager may reclaim pre-allocated ports. As shown at block 514, the central NAT manager sends a message to one or more host plug-ins on host devices associated with the VIP to release currently unused pre-allocated ports. The central NAT manager may send a release message to any number of host devices associated with the VIP, such as a single host device, a group of host devices, or all host devices associated with the VIP. A host device that receives a release message determines currently unused pre-allocated ports and releases at least a portion of those ports, as shown at block 516. The host plug-in then sends a message to the central NAT manager regarding the release of the unused pre-allocated ports, as shown at block 518. The message may include an identification of those ports that are being released.

Once the central NAT manager receives information regarding released pre-allocated ports, the central NAT manager may use those released ports for allocation purposes to satisfy the port allocation request from the endpoint, as shown at block 506, 508, 510, and 512.

Although FIG. 5 was described with reference to the central NAT manager reclaiming unused pre-allocated ports in response to a request for a dynamic allocation of ports to an endpoint, the central NAT manager may reclaim ports in the similar manner based on other factors. For instance, the central NAT manager may be configured with a threshold number of available ports, and once that threshold is passed, the central NAT manager may reclaim unused pre-allocated ports independent of any request for dynamic allocation of ports from an endpoint.

The central NAT manager may also instruct host devices to "un-pre-allocate" ports while a port is being used by an endpoint. If a pre-allocated port is currently being used by an endpoint when such an instruction is received, the endpoint may continue to use that port for the current communication. However, the state of the port as being pre-allocated may be switched to indicate that the port is no longer pre-allocated. As such, when the communication is completed, the port may be released.

Dynamic Port Size Allocation

As discussed previously, dynamic port allocation may be used in addition to pre-allocation of ports. For instance, dynamic port allocation may be used to allocate ports to endpoints for which no ports are pre-allocated. Additionally, when an endpoint exhausts the ports that are pre-allocated to that endpoint, the endpoint may request additional ports and a central NAT manager may dynamically allocate ports to that endpoint based on the request. When dynamically allocating ports to an endpoint, the central NAT manager may either allocate a fixed number of ports to the endpoint or the central NAT manager may dynamically determine a port allocation size (i.e., number of ports) to assign the endpoint based on a variety of factors.

Figure 6:
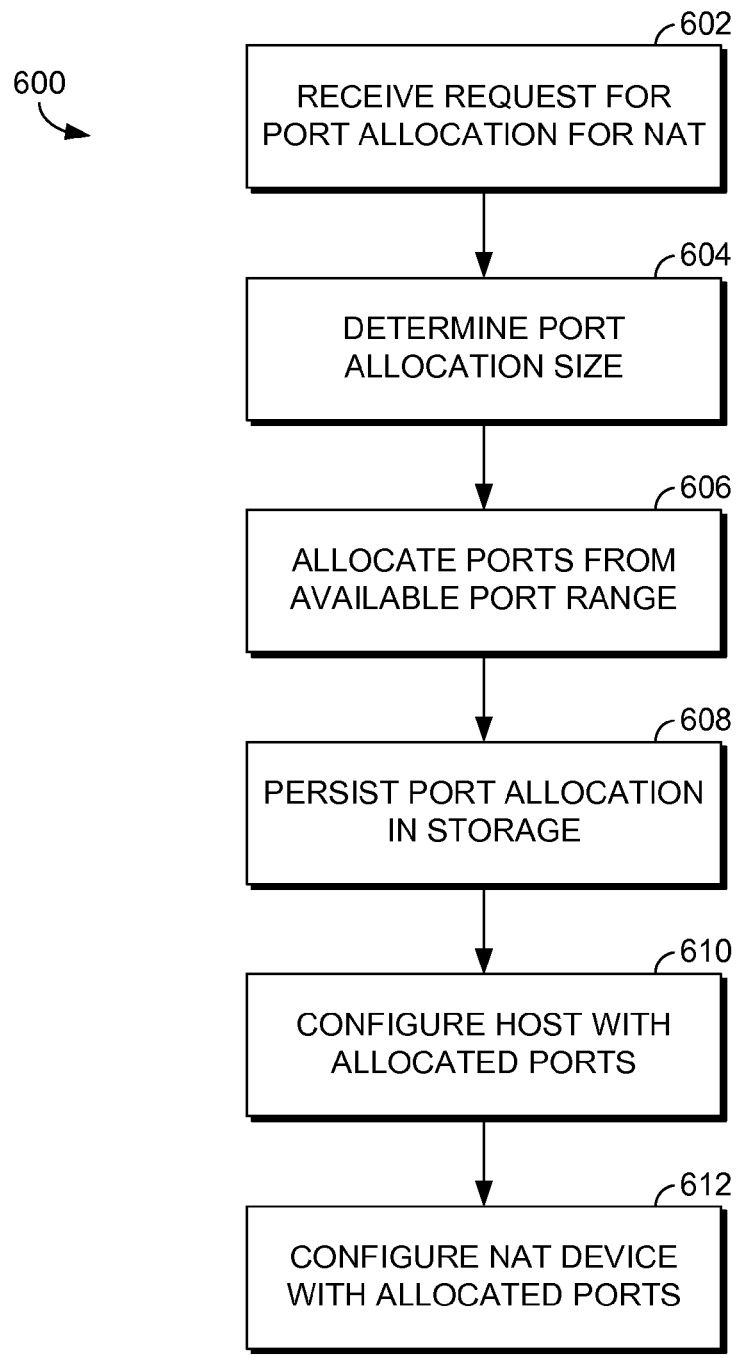
FIG. 6 is a flow diagram showing a method for dynamically allocating ports of varying port allocation size to endpoints in accordance with an embodiment of the present invention.

Turning now to FIG. 6, a flow diagram is provided that illustrates a method 600 for dynamically allocating ports of varying port allocation sizes to endpoints. As shown at block 602 a request for port allocation for NAT purposes is received at the central NAT manager from an endpoint. As noted above, the port allocation request may be from an endpoint that was previously pre-allocated ports but the endpoint has exhausted those pre-allocated ports.

As shown at block 604, the central NAT manager dynamically determines a port allocation size for the endpoint. The central NAT manager may dynamically determine the port allocation size for the endpoint in a variety of different manners. For instance, the central NAT manager may attempt to predict demand for ports for the endpoint and allocate ports based on the prediction. In some instances, the port allocation size may be based on history of how the tenant application and/or the particular requesting endpoint behave. For instance, historical information may indicate that at a certain time during each day, the endpoint needs a large number of ports. Another approach is to increase the port allocation size with each subsequent request for additional ports from a particular endpoint (as will be described in further detail below).

As shown at block 606, the central NAT manager allocates ports to the requesting endpoint from the available port range based on the determined port allocation size. The port allocation to the endpoint is persisted in storage, as shown at block 608. Additionally the host device hosting the endpoint is configured with the allocated ports, as shown at block 610, and the NAT device is configured with information regarding the allocated ports for the endpoint, as shown at block 612.

Figure 7:
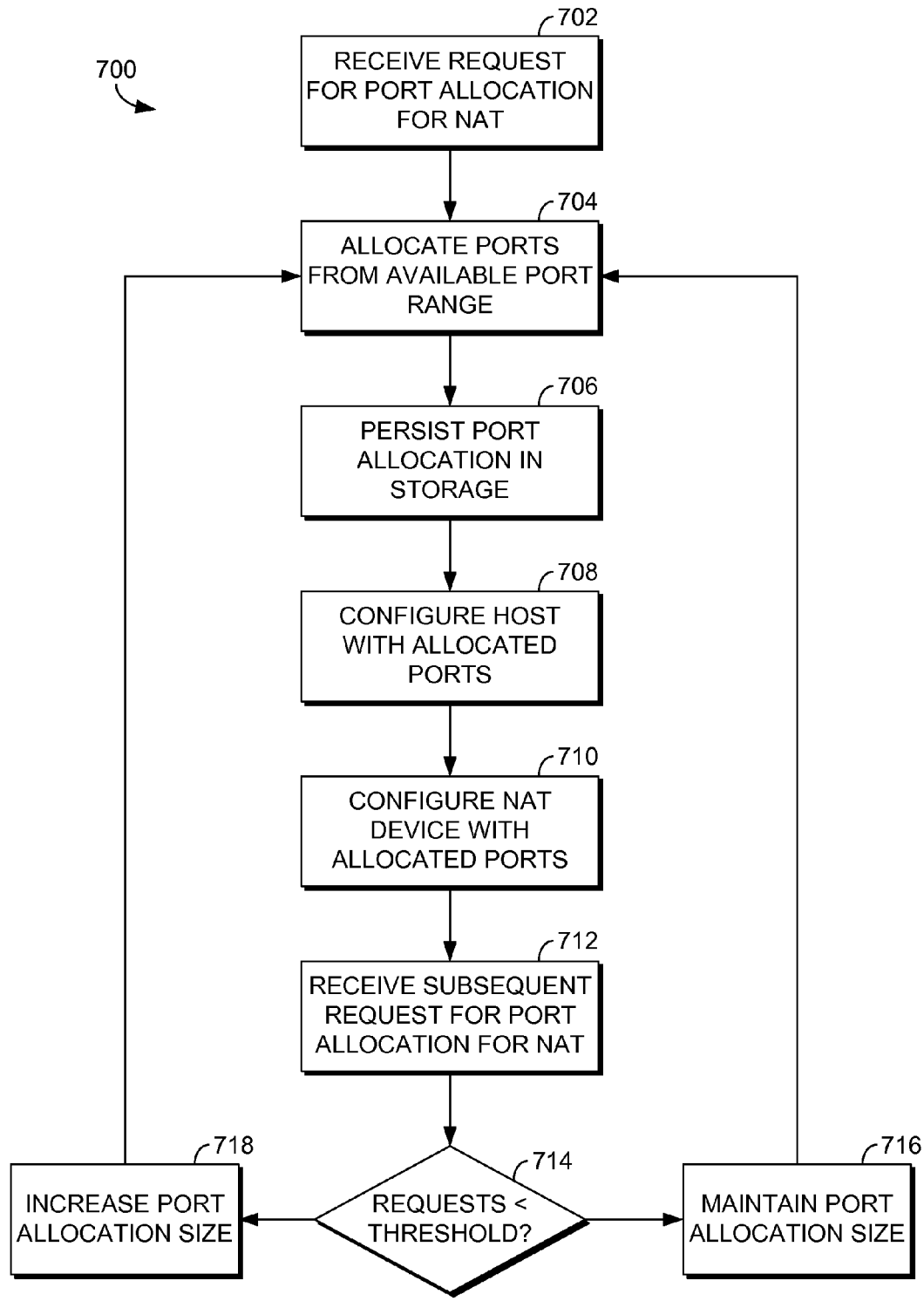
FIG. 7 is a flow diagram showing a method in which the port allocation size for a requesting endpoint is dynamically determined by increasing the port allocation size with subsequent port allocation requests in accordance with an embodiment of the present invention.

FIG. 7 provides a flow diagram of a method 700 in which the port allocation size for a requesting endpoint is dynamically determined by increasing the port allocation size with subsequent port allocation requests. This approach may be based on an assumption that an endpoint making a port allocation request at some point of time is likely to make more requests in the future. The increase in port allocation size may be exponential or some other increase factor. In some instances, the port allocation size is increased only if successive requests from an endpoint come within a predetermined time period.

As shown at block 702, an initial request for dynamic port allocation for NAT purposes is received at a central NAT manager from an endpoint. Based on the request, one or more ports from the available port range are allocated to the requesting endpoint by the central NAT manager, as shown at block 704. The port allocation to the endpoint is persisted in storage, as shown at block 706. Additionally the host device hosting the endpoint is configured with the allocated ports, as shown at block 708, and the NAT device is configured with information regarding the allocated ports for the endpoint, as shown at block 710.

A subsequent request for port allocation for NAT purposes is received at the central NAT manager from the same endpoint, as shown at block 712. It is determined at block 714 whether the current request for port allocation is within a certain time threshold of the previous request for port allocation. If it is determined that the current port allocation request is not within the time threshold, the port allocation size from the previous port allocation request, may be maintained as shown at block 716. Alternatively, if it is determined that the current port allocation request is within the time threshold from the previous port allocation request, the port allocation size is increased, as shown at block 718. Based on the maintained port allocation size or the increased port allocation size, the central NAT manager allocates ports for the endpoint from an available port range, as shown at block 704. The port allocations may be persisted in storage at block 706, the host may be configured with the allocated ports at block 708 and the NAT device may be configured with the allocated ports at block 710. As shown in FIG. 7, the process of receiving subsequent port allocation requests from and the endpoint in allocating ports may continue until the endpoint is de-configured.

By way of illustration of increasing port allocation size (using an exponential increase), suppose that the initial allocations for a VIP configuration at time T1 are as indicated below in Table 1. Each of these allocations is the result of the pre-allocation of parts made by the central NAT manager.

TABLE 1

| DIP | No. of slots allocated | Total number of slots after allocation |
| --- | --- | --- |
| 10.61.125.6 | 1 | 1 |
| 10.61.127.4 | 1 | 1 |
| 10.61.45.12 | 1 | 1 |

As shown below in Table 2, at time T2, DIP: 10.61.125.6 makes a port allocation request to the central NAT manager, which allocates two additional slots of ports to the endpoint.

TABLE 2

| DIP | No. of slots allocated | Total number of slots after allocation |
| --- | --- | --- |
| 10.61.125.6 | 2 (2 * 1) | 3 |
| 10.61.127.4 | 0 | 1 |
| 10.61.45.12 | 0 | 1 |

As shown below in Table 3, at time T3, DIP: 10.61.125.6 again makes a port allocation request. In response, the central NAT manager now allocates four additional slots of ports to the endpoint.

TABLE 3

| DIP | No. of slots allocated | Total number of slots after allocation |
| --- | --- | --- |
| 10.61.125.6 | 4 (2 * 2) | 7 |
| 10.61.127.4 | 0 | 1 |
| 10.61.45.12 | 0 | 1 |

At time T4, DIP: 10.61.125.6 again makes a request for additional ports. As shown in Table 4, the central manger now allocates eight additional slots of ports to the endpoint.

TABLE 4

| DIP | No. of slots allocated | Total number of slots after allocation |
| --- | --- | --- |
| 10.61.125.6 | 8 (2 * 4) | 15 |
| 10.61.127.4 | 0 | 1 |
| 10.61.45.12 | 0 | 1 |

At time T5, DIP: 10.61.127.4 makes a port allocation request. As shown in Table 5, the central manage allocates 2 additional to the endpoint since this is the second request for this endpoint.

TABLE 5

| DIP | No. of slots allocated | Total number of slots after allocation |
| --- | --- | --- |
| 10.61.125.6 | 0 | 15 |
| 10.61.127.4 | 2 (2 * 1) | 3 |
| 10.61.45.12 | 0 | 1 |

As can be seen from this example, the allocations of ports for endpoints grow exponentially (2*Number of slots most recently allocated) as new requests are received. This is true as long as the due time since the most recent allocation does not exceed a predefined interval. For instance, this interval could be set to five minutes or some other interval that reflects the likelihood that the endpoint will make additional requests.

This approach may address, among other things, the scenario where an endpoint makes a large number of outbound connections repeatedly to the same remote endpoint. By increasing the number of ports allocated at subsequent allocation requests, overall performance may be increased by reducing the frequency of port allocation requests to the central NAT manager.

In order to prevent an endpoint that has a sudden spike in requests from exhausting free NAT ports and hence denying other endpoints of ports, a check may be used whereby the exponential or other increased allocation may only proceed until a particular limit is reached. For instance, a limit of 128 slots may be employed. When that limit is reached and more allocated requests are made by the endpoint within a time interval that typically dictates an exponential increase, the central NAT manager may continue to allocate in chunks of ports at that limit (e.g., 128 slots).

Another variation of the dynamically sized allocation that may be employed is that while dynamically allocating increasing-sized port ranges, the central NAT manager could mark these port ranges as pre-allocated or otherwise indicating to the host plug-ins that these port ranges need not be returned even if free. This is so that if the traffic pattern is spiky in nature, it may be preferable to not have all the port ranges released in one shot. With this scheme, the central NAT manager may be able to withdraw or un-pre allocate port ranges if the overall number of free ports goes below a threshold or the central NAT manager runs out of available ports.

Reservation of Ports

A large part of the overhead of dynamically allocating ports to endpoints comes from the central NAT manager persisting state (e.g., the central NAT manager 302 storing the state of port assignments in the state repository 314 in FIG. 3)

each time a request for port allocations is received from an endpoint. In particular, each time a request for ports is received from an endpoint and the central NAT manager allocates ports to the endpoint, the central NAT manager persists state to the state repository, creating significant overhead in the process.

Another approach for optimizing allocation of ports that addresses this issue is referred to herein as "reserving" ports. In particular, during the initial configuration of endpoints, the central NAT manager may "reserve" ports for endpoints by assigning particular ports to particular endpoints and persisting those assignments in the state repository (e.g., the state repository 314 of FIG. 3). However, the central NAT manager does not configure the NAT device or the endpoints with the assigned ports. Instead, the central NAT manager waits for requests for ports from the endpoints. When the central NAT manager receives a request for ports from an endpoint, the central NAT manager configures the endpoint and the NAT device with ports from the range of ports reserved for the endpoint and records the reservation in memory. However, there is no need to touch the persisted storage at that time because the persisted storage already reflects that those ports are assigned to that endpoint. As such, this allocation in response to the request from the endpoint is purely an in memory operation and does not persist to the state repository.

The central NAT manager may initially reserve ports for endpoints of a VIP in a variety of different manners. For instance, an equal number of ports may be reserved for the endpoints. In other instances, a different number of ports may be reserved for different endpoints based on what the central NAT manager determines would be an optimal reservation (e.g., based on historical information, information specified in the configuration files for the VIP, etc.).

Although the central NAT manager makes an initial reservation of ports for endpoints as part of pre-configuration, the central NAT manager may also make port reservations during runtime. For instance, if an endpoint is low on available reserved ports or runs out of reserved ports, additional ports may be reserved for the endpoint by assigning unreserved ports to the endpoint and persisting that state in the state repository. Additionally, the central NAT manager may reallocate reserved ports among different endpoints during runtime. For instance, if one endpoint needs additional ports to be reserved for the endpoint and a second endpoint has a large number of reserved ports that are not being used, the central NAT manager may reallocate reserved ports from the second endpoint to the first endpoint. This may simply include a change in state for the ports in the state repository. There is no need to reclaim ports from hosts and the NAT device since the ports were not actually allocated to those devices (i.e., those devices were not configured to use them).

If the central NAT manager fails and needs to be reconstructed, the central NAT manager may be reconstructed based on the reservations state in the state repository. This prevents the central NAT manager from allocating a port reserved for one endpoint to another endpoint. However, the central NAT manager may need to reconstruct its internal in memory for the ports actually allocated to endpoints. To do so, on host reconnect, the central NAT manager may request the hosts provide this information and recreate its internal state for the endpoints from the information provided by the hosts.

Accordingly, the "reservation" of ports is similar to the "pre-allocation" of ports discussed hereinabove, except that the endpoints and NAT device are not initially pre-configured with ports. Instead, the endpoints and NAT device are configured in response to endpoints' requests for ports. As a result, the persisted storage may only be accessed when originally persisting reservations, when making changes to reservations (which may be minimal), or if there is a need to reconstruct the central NAT manager.

One additional variation of the above approach would include configuring the NAT device with reserved ports for endpoints as part of the initial configuration while not configuring the endpoints. As such, when requests for port allocations are received, only the endpoints are configured in response to the requests since the NAT device is pre-configured.

Figure 8:
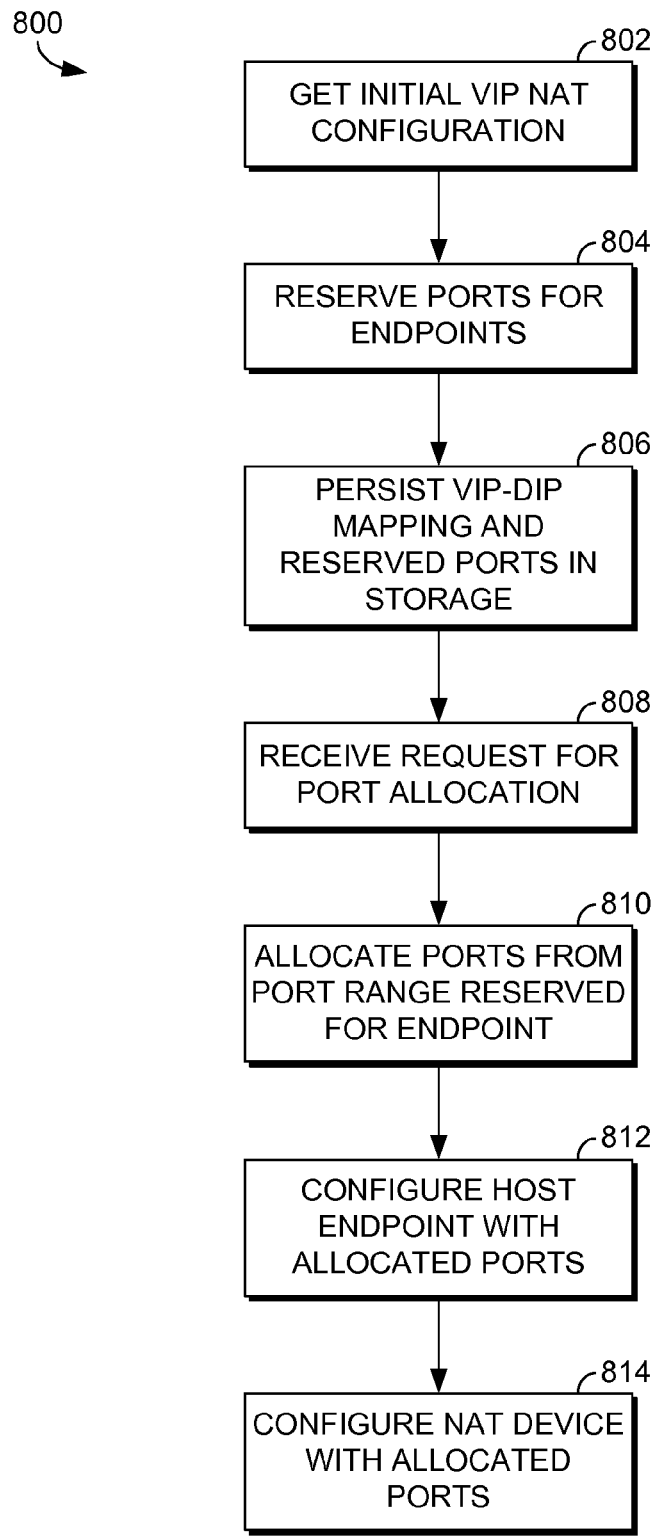
FIG. 8 is a flow diagram showing a method for initially reserving ports and then allocating ports from reservations in accordance with an embodiment of the present invention.

With reference now to FIG. 8, a flow diagram is provided that illustrates a method 800 for initially reserving ports and then allocating ports from reservations. As shown at block 802, a central NAT manager, such as the central NAT manager 302 of FIG. 3, receives an initial VIP NAT configuration for a tenant. The VIP NAT configuration may include information such as identification of the VIP, identification of the endpoints (each identified by a DIP) associated with the VIP, and the particular endpoints that are to likely make outbound connections.

In accordance with the VIP NAT configuration and/or other information available to the central NAT manager, the central NAT manager reserves ranges of ports to different endpoints for the VIP, as shown at block 804. For instance, the central NAT manager may split a pool of available ports for the VIP into a range of ports for each of the endpoints requiring outbound connections. The range of ports may be the same size for each endpoint or different size ranges may be employed.

Based on the reservation of ports for endpoints, the central NAT manager durably stores information regarding the VIP-DIP mapping and reserved ports in storage, such as in the state repository 314 of FIG. 3, as shown at block 806. The persisted information may include a mapping that associates the ports to the DIPs to which the ports were reserved and associates the DIPs with the VIP.

During runtime, a request for port allocation is received at the central NAT manager from an endpoint, as shown at block 808. In response to the request, the central NAT manager allocates ports from the range of ports reserved for that endpoint, as shown at block 810. As part of this allocation, the central NAT manager communicates with host plug-ins on host devices and a NAT device to configure those components based on the allocation of ports. In particular, the hosts and the NAT device are on the data path when outgoing connections are made and return packets are received. As such, the central NAT manager configures a host device hosting the requesting endpoint with allocated ports, as shown at block 812. Additionally, the central NAT manager configures the NAT device with the allocated ports by providing information regarding the ports and the requesting endpoint (e.g., by providing DIP-port mappings), as shown at block 814.

Partitioning of NAT Resources

Figure 9:
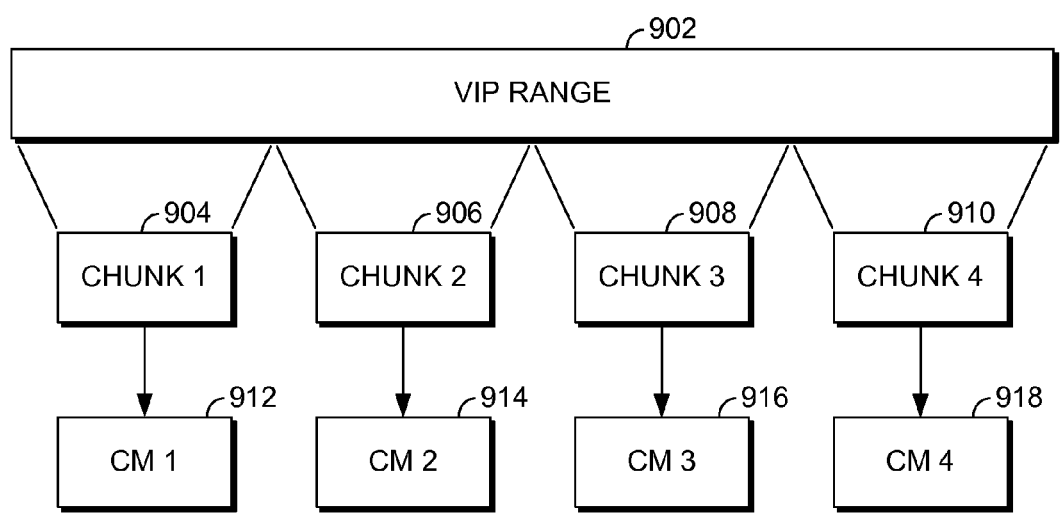
FIG. 9 is a block diagram showing partitioning of NAT resources among multiple central NAT managers in accordance with an embodiment of the present invention.

In some embodiments, multiple central NAT managers may be employed instead of using just one central NAT manager, and the central NAT managers may share responsibilities. For instance, as illustrated in FIG. 9, a range of VIP addresses 902 may be partitioned into chunks of VIP addresses 904, 906, 908, 910, and each central NAT manager 912, 914, 916, 918 may be tasked with managing ports for VIP addresses in its assigned chunk. Each VIP address may be managed by a single central NAT manager, and each central NAT manager may manage multiple such VIP addresses. This way, for instance, if hosts have to request ports at runtime, depending on the VIP, they direct their request to a specific central NAT manager instance. By employing multiple central NAT managers that each manage a portion of an overall port range, the process of port allocation and release may be faster. Additionally, this approach may scale better than using a single central NAT manager since requests are distributed to different central NAT managers.

Each central NAT manager may use a different port allocation scheme from the other central NAT managers. For instance, one central NAT manager may employ a pre-allocation scheme while another central NAT manager may employ a reservation approach. The scheme employed by each central NAT manager may be based on the nature of the tenant/endpoints being served by the central NAT manager. Additionally, a central NAT manager can switch the allocation scheme being used over time as the nature of the endpoints being served may change.

As can be understood, embodiments of the present invention provide efficient port allocation to endpoints of a tenant application in a hosting environment for NAT purposes. Although the techniques have been described in the context of a tenant being hosted in a hosting environment, it should be understood that these techniques may be applied to other applications employing NAT.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer hardware memory storing computer-useable instructions that, when used by one or more computing devices, cause the one or more computing devices to perform a method, the method comprising:
    receiving initial configuration information for a tenant application to be hosted by a hosting environment, the tenant application being associated with at least one virtual IP (VIP) address, the initial configuration information specifying endpoints for the tenant application, each endpoint having a direct IP (DIP) address corresponding with the at least one VIP address;
    as part of a configuration process for the tenant application:
        pre-allocating ports to the endpoints, wherein pre-allocating ports comprises allocating the ports to the endpoints during initial configuration of the tenant application, in advance of any connection attempts via the endpoints;
        persisting state information in storage, the state information mapping the at least one VIP address to the DIP addresses for the endpoints and mapping the DIP addresses for the endpoints to the ports pre-allocated to the endpoints;
    receiving a dynamic port allocation request from an endpoint that was pre-allocated one or more ports;
    determining a port allocation size for the endpoint;
        wherein determining the port allocation size for the endpoint comprises:
            determining the dynamic port allocation request from the endpoint is a subsequent port allocation request following a previous port allocation request from the endpoint;
            determining whether the dynamic port allocation request is within a threshold period of time following the previous port allocation request;
            if the dynamic port allocation request is not within the threshold period of time following the previous port allocation request, using a pre-determined port allocation size;
            if the dynamic port allocation request is within the threshold period of time following the previous port allocation request, increasing the port allocation size from the previous port allocation size,
    configuring host devices hosting the endpoints with information regarding the ports pre-allocated to the endpoints; and
    configuring a network address translation (NAT) device with information regarding the ports pre-allocated to the endpoints.

2. The one or more computer hardware memory of claim 1, wherein the initial configuration information identifies a subset of endpoints for the tenant application to be provided with NAT functionality, wherein ports are pre-allocated for only the subset of endpoints.

3. The one or more computer hardware memory of claim 1, wherein the same number of ports are pre-allocated to each of the endpoints.

4. The one or more computer hardware memory of claim 1, wherein the number of ports pre-allocated to endpoints is variable based on at least one selected from the following: predicted demand for ports; and number of endpoints associated with the at least one VIP address.

5. The one or more computer hardware memory of claim 1, wherein the method further comprises:
    determining that the number of endpoints does not exceed a threshold number of endpoints; and
    pre-allocating the ports to the endpoints based on determining that the number of endpoints does not exceed the threshold number of endpoints.

6. The one or more computer hardware memory of claim 1, wherein the method further comprises:
    determining that a number of ports available for allocation is below a threshold;
    sending a message to one or more host devices to release currently unused pre-allocated ports, the one or more host devices releasing one or more pre-allocated ports in response to the message; and
    receiving a notification from the one or more host devices that the one or more pre-allocated ports have been released by the one or more host devices.

7. The one or more computer hardware memory of claim 1, wherein the method further comprises:
    allocating ports from an available port range to the endpoint in accordance with the port allocation size, wherein a first port of the allocated ports is indicated as a non-pre-allocated port and is released by the endpoint when an outbound connection with the first port is completed.

8. The one or more computer hardware memory of claim 7, wherein the port allocation size for the endpoint is determined based on at least one selected from the following: predicted demand for ports for the endpoint; and historical information of how the tenant application and/or the endpoint behaves.

9. A method for allocating ports to endpoints of a tenant application being hosted by a hosting environment, the tenant application being assigned a virtual IP (VIP) address and the endpoints being assigned a direct IP (DIP) address corresponding with the VIP address, the method comprising:

initially pre-allocating ports to the endpoints of the tenant application during initial configuration of the tenant application;

receiving a first request for additional ports from a first endpoint of the tenant application;

assigning a first set of additional ports to the first endpoint in response to the first request;

persisting state information for the first set of additional ports in storage; configuring a host device hosting the first endpoint and a network address translation device (NAT) device with information regarding the first set of additional ports assigned to the first endpoint;

receiving a second request for additional ports from the first endpoint;

determining if the second request is within a threshold period of time following the first request;

if the second request is not within the threshold period of time following the first request, assigning a second set of additional ports that has the same number or lower number of ports as the first set of additional ports;

if the second request is within the threshold period of time following the first request, assigning a second set of additional ports that has a greater of ports than the first set of additional ports;

persisting state information for the second set of additional ports in storage; and configuring a host device hosting the first endpoint and the NAT device with information regarding the second set of additional ports assigned to the first endpoint.

10. The method of claim 9, wherein initially pre-allocating ports to the endpoints of the tenant application during initial configuration of the tenant application comprises:

pre-allocating ports to the endpoints;

persisting state information in storage, the state information mapping the VIP address to the DIP addresses for the endpoints and mapping the DIP addresses for the endpoints to the ports pre-allocated to the endpoints;

configuring host devices hosting the endpoints with information regarding the ports pre-allocated to the endpoints; and configuring a network address translation (NAT) device with information regarding the ports pre-allocated to the endpoints.

11. The method of claim 9, wherein initial configuration of the tenant application is in accordance with initial configuration information, the initial configuration information identifying a subset of endpoints for the tenant application to be provided with NAT functionality, wherein ports are pre-allocated for only the subset of endpoints.

12. The method of claim 9, wherein the same number of ports are pre-allocated to each of the endpoints.

13. The method of claim 9, wherein different numbers of ports are pre-allocated to different endpoints.

14. The method of claim 9, wherein the method further comprises:

determining that a number of ports available for allocation is below a threshold;

sending a message to one or more host devices to release currently unused pre-allocated ports, the one or more host devices releasing one or more pre-allocated ports in response to the message; and receiving a notification from the one or more host devices that the one or more pre-allocated ports have been released by the one or more host devices.

15. The method of claim 14, wherein the determination that the number of ports available for allocation is below a threshold is in response to a request for dynamic allocation of ports from an endpoint of the tenant application.

16. The method of claim 9, wherein configuring the host device hosting the first endpoint with information regarding the first set of additional ports assigned to the first endpoint includes indicating that each port from the first set of additional ports need not be released if each port is unused by the first endpoint.

17. A system for allocating ports to endpoints of a tenant application being hosted by a hosting environment, the tenant application being assigned a virtual IP (VIP) address and the endpoints being assigned a direct IP (DIP) address corresponding with the VIP address, the system comprising:

a plurality of host devices hosting the endpoints of the tenant application, each host device comprising a host-plug-in facilitating configuration of ports for endpoints for NAT purposes;

a NAT device providing NAT functionality;

a central NAT manager having a processor and being configured to (1) pre-allocate ports to the endpoints, wherein pre-allocating ports comprises allocating the ports to the endpoints during initial configuration of the tenant application, in advance of any connection attempts via the endpoints and wherein the ports are designated to be excluded from automatic release of the ports even when the ports are unused; and (2) persisting state information in storage, the state information mapping the at least one VIP address to the DIP addresses for the endpoints and mapping the DIP addresses for the endpoints to the ports pre-allocated to the endpoints;

wherein the central NAT manager is further configured for:

receiving a dynamic port allocation request from an endpoint that was pre-allocated one or more ports;

determining a port allocation size for the endpoint;

wherein determining the port allocation size for the endpoint comprises:

determining the dynamic port allocation request from the endpoint is a subsequent port allocation request following a previous port allocation request from the endpoint;

determining whether the dynamic port allocation request is within a threshold period of time following the previous port allocation request;

if the dynamic port allocation request is not within the threshold period of time following the previous port allocation request, using a pre-determined port allocation size;

if the dynamic port allocation request is within the threshold period of time following the previous port allocation request, increasing the port allocation size from the previous port allocation size.

18. The system of claim 17, wherein the central NAT manager is further configured for:

allocating ports from an available port range to the endpoint in accordance with the port allocation size, wherein a first port of the allocated ports is indicated as a non-pre-allocated port and is released by the endpoint when an outbound connection with the first port is completed.

\* \* \* \* \*